(12) United States Patent
Beck

(10) Patent No.: US 6,199,961 B1
(45) Date of Patent: Mar. 13, 2001

(54) HYDRAULIC VEHICLE BRAKE SYSTEM

(75) Inventor: Erhard Beck, Weilburg (DE)

(73) Assignee: Continental Teves AG & Co., OHG (DE)

( * ) Notice: Subject to any disclaimer, the term of this patent is extended or adjusted under 35 U.S.C. 154(b) by 0 days.

(21) Appl. No.: 09/380,418

(22) PCT Filed: Feb. 27, 1998

(86) PCT No.: PCT/EP98/01136

§ 371 Date: Nov. 19, 1999

§ 102(e) Date: Nov. 19, 1999

(87) PCT Pub. No.: WO98/38069

PCT Pub. Date: Sep. 3, 1998

(30) Foreign Application Priority Data

Mar. 1, 1997 (DE) .............................. 197 08 425

(51) Int. Cl.$^7$ ................. B60T 8/32; B60T 8/36; B60T 8/48; B60T 13/68
(52) U.S. Cl. .................... 303/116.1; 303/113.2; 303/900; 303/901; 303/119.2
(58) Field of Search ............................ 303/113.1, 113.2, 303/113.3, 116.1–116.4, 119.2, 119.3, 119.1, 10–12, 900, 901; 251/129.15, 129.01, 129.08, 129.22, 118; 137/614.19, 614.21

(56) References Cited

U.S. PATENT DOCUMENTS 5,918,948 * 7/1999 Burgdorf et al. ................. 303/113.2

FOREIGN PATENT DOCUMENTS

| 41 21 601 | 1/1993 | (DE) . |
|---|---|---|
| 42 13 710 | 10/1993 | (DE) . |
| 42 32 311 | 2/1994 | (DE) . |
| 44 25 578 | 1/1996 | (DE) . |
| 44 46 525 | 6/1996 | (DE) . |
| 195 04 077 | 8/1996 | (DE) . |
| 196 05 476 | 8/1996 | (DE) . |
| 195 15 281 | 10/1996 | (DE) . |
| 195 23 946 | 1/1997 | (DE) . |
| 195 29 724 | 2/1997 | (DE) . |
| 195 37 926 | 4/1997 | (DE) . |
| 0 482 367 | 4/1992 | (EP) . |

OTHER PUBLICATIONS

Search Report of the German Patent Office for Application No. 197 08 425.7.

* cited by examiner

Primary Examiner—Douglas C. Butler
(74) Attorney, Agent, or Firm—Rader, Fishman & Grauer PLLC

(57) ABSTRACT

A vehicle brake system which permits both anti-lock control and different controls of independent force braking operations. In an independent force braking operation, a starting brake pressure is built up in the return circuit in the wheel brakes by way of a precharging pressure generator and the pump and is modulated in the following control phase according to the control algorithms of the selected control. Interposed between the precharging pressure generator and the return pump is a change-over valve which has three switching positions, i.e., one closed, one open, and one throttled. The change-over valve adopts its open position in the filling phase and its throttled position in the control phase. It is so configured that the switching position is achieved as a function of the initial pressure in the inlet chamber but independently of the actuating force which actuates the valve. In the absence of initial pressure, the valve gradually shifts into the open position, opening first a small and then a large cross-section. In the presence of initial pressure in the inlet chamber, the actuating force can only open the small cross-section. The actuating force is so rated that it is unable to overcome the pressure difference applied via the small cross-section which acts on the closure member of the main valve.

7 Claims, 2 Drawing Sheets

HYDRAULIC VEHICLE BRAKE SYSTEM

TECHNICAL FIELD

The present invention relates to vehicle brakes and more particularly relates to a hydraulic vehicle brake system which includes a brake pressure generator operable by both the vehicle driver and a precharging pressure generator.

BACKGROUND OF THE INVENTION

Basic hydraulic vehicle brake systems are equipped with a pedal-operated brake pressure generator and brake circuits with wheel brakes connected thereto. When the driver's objective is to initiate braking, the pedal is depressed, and the force applied to the pedal is transmitted to a master brake cylinder, boosted if necessary or desired. This causes development of a pressure in the brake circuits which becomes effective in the wheel brakes and results in a decrease of the rotating speed of the wheels with respect to their roll velocity. The result is that in the tire contact area of the wheels brake forces are transmitted which cause deceleration of the vehicle.

Wheel lock may occur in such a braking operation. Therefore, anti lock brake systems (ABS) have been developed which modulate the wheel brake pressures under braking conditions which cause the wheel to lose traction comprises pressure modulation valves, i.e., one inlet valve and one outlet valve, and the valve switching conditions dictate whether pressure fluid is removed from the wheel brakes for pressure reduction or pressure fluid is supplied to the wheel brakes for pressure increase. Further included is a pump which furnishes pressure fluid into the brake circuit in order to replace the pressure fluid removed for the modulation of the wheel brake pressures. The system may have many different configurations. Frequently, the so-called recirculation principle is used wherein the pump is configured as a non-self-priming return pump which returns the pressure fluid that was removed from the wheel brakes via the open outlet valve directly into the brake circuit upstream of the inlet valve. Locking of the wheels during a braking operation may effectively be prevented by appropriately activating the valves and the pump.

An anti-lock vehicle brake system of this type can be improved and extended to a brake system with driving stability control or traction slip control (DSC or TCS). In traction slip control operations, pressure is built up in the wheel brakes of the driven wheels, and the brake torque produced counteracts the drive torque so as to decrease the drive torque to an extent that the wheels do not lose traction. Thus, spinning of the wheels when starting to drive is prevented with this method. In driving stability control operations, a brake pressure (individual for each wheel) is built up on the wheels of the vehicle so that the brake forces produced generate a torque about the vertical axis of the vehicle which counteracts an excessive yaw rate of the vehicle.

These two types of controls and some other types of control not referred to have in common that a wheel brake pressure must be generated in individual or in all wheel brakes without pedal application being effected. Therefore, these braking operations are termed as independent force braking operations. In such braking operations, initially, the wheel brakes have to be filled with pressure fluid in a filling phase in order to generate a starting brake pressure which can then be modulated in a subsequent control phase in conformity with the respective control selected.

The pump of the anti-lock control system is used to build up the starting brake pressure. It has been shown that this pump is not in all cases capable of sufficiently quickly building up the required start brake value alone. So-called precharging pressure generators are installed into the brake system which, in the filling phase, deliver pressure fluid either directly to the wheel brakes (direct conduit) or to the suction side of the pump which conducts the fluid by increasing its pressure to the wheel brakes (indirect conduit).

The precharging pressure generator can be an additional pump as has been described in German patent application No. 42 13 710, for example. However, systems are also possible wherein the booster of the pedal-operated brake pressure generator is so activated that it operates the master brake cylinder even without pedal depression, and the hydraulic wiring of the brake circuits provides a connection between the master brake cylinder and the suction side of the pump. A system of this type is presented in German patent application No. 44 25 578, for example.

A so-called change-over valve is provided in both systems between the precharging pressure generator (pump or independently actuated master brake cylinder) to establish the connection at least in the control phase but also already in the filling phase of an independent cross-sections are used to this end, as described e.g. in German patent application serial No. 19529272455 dated Aug. 12, 1995.

In the filling phase, these valves provide a large cross-section after a short switching time so that the precharging pressure generator can deliver a sufficient amount of pressure fluid to the suction side of the (return) pump. However, the large cross-section suffers from the disadvantage that the pressure fluid is delivered to the pump in an undamped manner. This causes the development of loud noise because the pressure fluid column in the supply line to the pump is either greatly accelerated or abruptly slowed down with the opening and closing of the suction valve of the pump (configured as a piston pump). The pressure impacts in the suction line of the pump which are produced especially due to the abrupt slowing down are transmitted as structure-borne sound and emitted as air-borne sound transmission. Hence, major noises develop in an independent force braking operation which are possibly misinterpreted by the driver and, at least, are disturbing.

Therefore, an object of the present invention is to improve upon a vehicle brake system of the type described hereinabove so that an independent force braking operation is permitted at a minimum possible noise level. To this effect, the present invention proposes that there are three switching positions in the change-over valve, i.e., one closed, one open, and one throttled, and that the control device is so configured that in an independent force braking operation, the change-over valve is caused to adopt its throttled position in the control phase and its open position in the filling phase at least for one of the envisaged types of control.

However, even in controls which normally render necessary a rapid brake pressure build-up until the starting brake pressure, it will be sufficient under certain circumstances to effect the pressure build-up in the filling phase only by way of the direct conduit. This can be sufficient e.g. when braking on a low coefficient of friction, because the precharging pressure generator is then able to generate the starting brake pressure alone. The present invention further suggests that the control device includes a decision-making circuit which, on the basis of the data it has available, determines the starting brake pressure to be achieved in the filling phase and, when the latter pressure is lower than the initial pressure which can be generated by the precharging pressure generator, maintains the change-over valve in its closed position in the filling phase.

Another objective is to configure the change-over valve so that it is able to provide the required switching conditions in a most simple manner. The present invention discloses configuring the valve as a bistable valve which switches into the throttled or into the open position as a function of the inlet pressure while the actuating force remains equal.

A bistable valve of this type can be designed differently. In the present case, as proposed, the switching valve has two parallel arranged commutable passages, i.e., the passage of a pilot valve and that of a main valve, and the valve seat of the one valve is provided on the valve closure member of the other valve, and there is a joint actuation for both valves.

Further, it is disclosed that the valve closure member of the pilot valve is coupled directly to the actuating tappet, on the one hand, and the valve closure member of the main valve is coupled to the actuating tappet by way of a lost motion clutch, on the other hand. Valves of such a design are employed, for example, to permit quick opening of a main valve of large cross-section. This is because a certain pressure compensation is produced already by opening the pilot valve with a small cross-section so that the valve closure member of the main valve will put up only a small resistance to the actuating forces.

To achieve this object, the present invention discloses adapting the characteristics of a valve of this type (opening cross-sections of main and pilot valve, lost travels, spring forces and actuating forces) so that, when the valve is actuated under initial pressure, the actuating forces are not sufficient to overcome the pressure forces which act upon the valve closure member of the main valve, caused by the pressure gradient on the orifice of the pilot valve. The result is that the valve, switched under pressure, remains in its throttled position, and the throttling effect is determined by the switched orifice of the pilot valve.

As has been mentioned hereinabove, it may be necessary to switch the valve into the open position in the filling phase and into the throttled position in the control phase.

A switching signal sequence is provided in the control device to this end in order to initially render the open valve inactive again so that it closes to be subsequently re-actuated. The valve is moved into the throttled position (as explained hereinabove) when initial pressure is applied.

DETAILED DESCRIPTION OF THE PREFERRED EMBODIMENT

Figure 1:
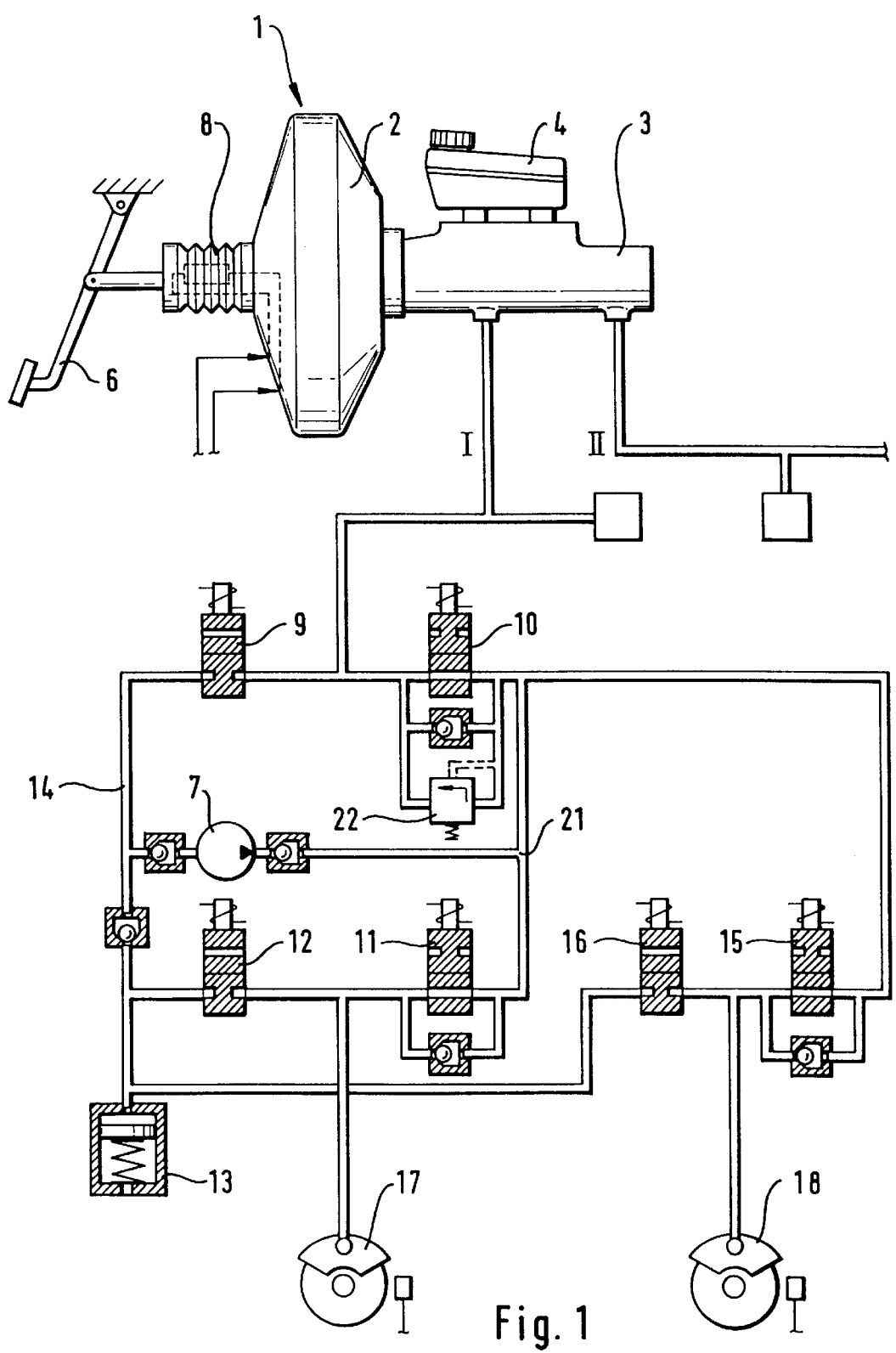
FIG. 1 is a view of a hydraulic wiring diagram of the brake system of the present invention.

The brake system includes two brake circuits I, II having an identical design so that the following description applies to the first and the second brake circuit. The desired pressure in the brake circuits is generated by way of a brake pressure generator 1. The brake pressure generator 1 is activated by means of a pedal 6 and comprises a pneumatic booster 2 and a tandem master brake cylinder 3 having chambers which are connected to a supply reservoir 4 in the non-actuated initial position of the master brake cylinder. Further, the two chambers are connected by way of brake lines to the wheel brakes 17, 18 of one brake circuit respectively. The wheel brakes 17, 18 shown are associated either with the wheels of an axle (black-and-white brake circuit allotment) or with the diagonally opposite wheels on the vehicle (diagonal brake circuit allotment).

In order to modulate the wheel brake pressure which acts in the wheel brakes, an inlet valve 11, 15 and an outlet valve 12, 16 as well as a return pump 8 is provided for each wheel brake. Both valves are actuated electromagnetically, and the inlet valve 11, 15 is normally open, and the outlet valve 12, 16 is normally closed. The inlet valve 11, 15 is arranged in the brake line, and the outlet valve 12, 16 establishes the connection a low-pressure accumulator 13.

To reduce the wheel brake pressure, the outlet valve is [being] opened when the inlet valve is closed so that pressure fluid can flow off from the wheel brake into the low-pressure accumulator 13. To maintain the pressure, both valves will be closed. To re-increase the pressure, the inlet valve is re-opened.

The pressure fluid conducted into the low-pressure accumulator 13 is returned into the brake circuit by means of the return pump 7. The pressure side of the pump is connected to an intersection 21 in the joint brake line upstream of the inlet valve 11, 15. The return pump and the inlet and outlet valves 11, 15 and 12, 16 are actuated by a control device (not shown) which emits its switching signals according to a defined control algorithm.

Above all, signals from various sensors are processed in this control algorithm. For anti-lock control, the signals of so-called wheel sensors are necessary which sense the rotational behavior of the wheels being braked. Depending on which control shall be carried out, the control device requires further sensor signals. For driving stability control, the signals of a yaw velocity sensor and a steering angle sensor are e.g. required. For an independent force braking operation, where a quick initial activation of the brakes is to be effected prior to the actual pedal-operated braking (brake assistant), the signal of a pedal sensor that senses the actuation as such and the actuating speed is required.

To be able to develop a wheel brake pressure irrespective of pedal application, there is provision of a change-over valve 9 and a separating valve 10. The separating valve 10 is arranged in the brake line upstream of the intersection 21 mentioned above, and the change-over valve 9 is inserted into a connecting line 14 between the suction side of the return pump 7 and the supply reservoir 4.

Because the chambers of the master brake cylinder are connected to the supply reservoir 4 when the master brake cylinder 3 is not actuated (as explained hereinabove), the connection is so established in this embodiment that the connecting line 14 is connected directly to one of the chambers of the master brake cylinder 3.

To build up a pressure in the wheel brakes irrespective of pedal application which is modulated in the control phase following the filling phase, the separating valve 10 is closed, and the change-over valve 9 opened and the return pump 7 switched on. Pump 7 aspirates pressure fluid from the supply reservoir 4, by way of the open change-over valve, into the intersection 21. The pressure fluid is conducted from there to the wheel brakes 17, 18 until the starting brake pressure is reached. The return flow to the supply reservoir 4 is interrupted because the separating valve 10 is closed. A pressure-limiting valve 22 connected in parallel to the separating valve 10 sets the pressure in the brake line downstream of the separating valve 10 to a maximum value.

The starting brake pressure is reached as soon as the respectively active control (DSC, TCS) initiates reduction of the pressure in the wheel brakes. The control of the independent force braking will now enter into the actual control phase where the pressure in the wheel brakes is adapted to the prevailing conditions by opening and closing the inlet and outlet valves.

It is particularly important for some independent force braking operations that the brake pressure is quickly built up until the starting brake pressure, i.e., that the filling phase is passed through quickly.

Especially in those cases where the return pump 7 is designed as a non-self-priming pump, a so-called precharging pressure generator is necessary which is integrated in the booster 2 in this embodiment. The booster has a control valve 8 which is actuated by the pedal 6 and adjusts a boosting pressure as a function of the pedal pressure. The control valve is given an additional electromagnetic activation so that the booster can be controlled to reach its maximally attainable boosting force irrespective of a pedal application in order to develop an initial pressure in the master brake cylinder 3 which can be put into effect in the wheel brakes. The filling phase can be realized in different ways. In a first possibility, the change-over valve 9 remains closed and the separating valve 10 open in the filling phase. The pressure in the master brake cylinder is conducted to the wheel brakes by way of the brake line exactly as in a normal braking operation. The separating valve 10 must be closed and the change-over valve 9 opened when the initial pressure in the wheel brakes has been reached at the latest so that the return pump 7 can build up a pressure in the wheel brakes which is in excess of the initial pressure. One may proceed this way in some types of independent force braking operations because the rapidity of pressure increase is not of decisive importance. This switching variation can also be used when one has to assume that the start brake value is lower than the initial pressure that can be generated by the precharging pressure generator.

The second possibility involves opening the change-over valve 9 in the filling phase so that a rapid pressure build-up in the wheel brakes can take place with the assistance of the pump. The separating valve 10 can remain open at least until the initial pressure value in the wheel brakes is reached. Signals for the separating valve 10 and the change-over valve 9 and for the brake pressure control valve 8 are also generated by the control device according to defined algorithms.

Figure 2:
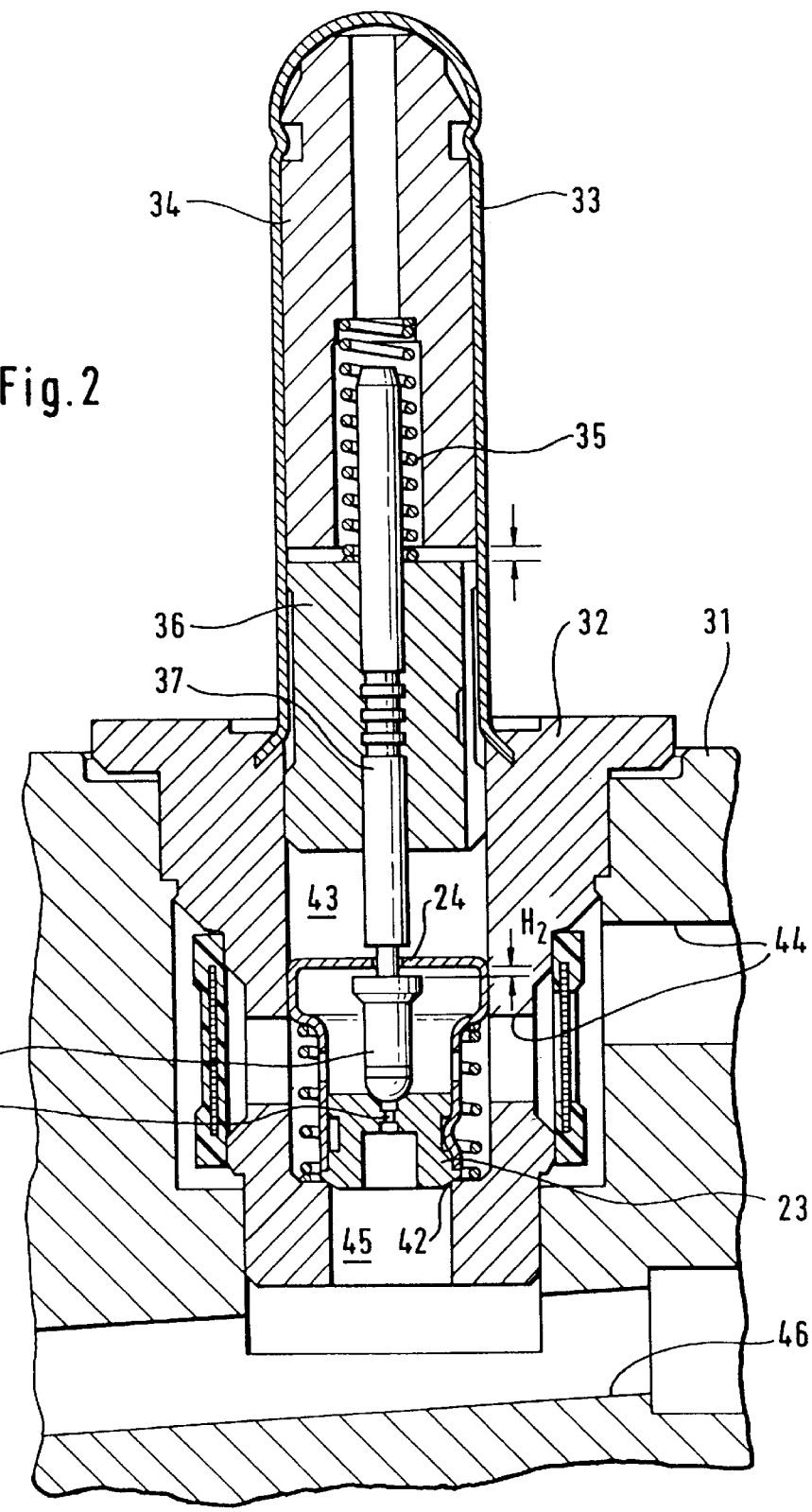
FIG. 2 is a view of a cross-section taken through the change-over valve of the brake system.

FIG. 2 shows a preferred embodiment of a change-over valve 9. The change-over valve includes a valve housing 32 with a sleeve 33. A magnetic core 34 and the associated magnetic armature 36 are guided in the sleeve one behind the other. Provided on the frontal end of the magnetic armature 36 remote from the magnetic core 34 is an actuating tappet 37 with a valve closure member 27 which is urged against a valve member 23 under the effect of a spring 35 compressed between the magnetic armature 36 and the magnetic core 34.

The valve itself comprises a pilot valve and a main valve and has two hydraulically parallel connected passages. Passage 41 of the pilot valve is provided in the valve member 23 and actuated directly by the valve closure member 27. Passage 42 of the main valve is provided in the valve housing 32 and closed by the valve member 23 which herewith forms the valve closure member of the main valve.

The passages lead into an inlet chamber 43 which is connected to the precharging pressure generator, i.e., to the master brake cylinder 3 in this case, by way of transverse channels 44 in the valve housing 32 and in a valve block 31. The pressure in the inlet chamber acts upon the valve closure member 27 and the valve member 23 in a sense closing the passages.

The passages lead on the other side into an outlet chamber 45 which is connected to a transverse channel 46 arranged in the valve block 31. Channel 46, in turn, is in connection to the suction side of the pump 7. The electromagnetic actuating forces, the orifice cross-section of the pilot valve, and the spring 35 are conformed to each other so that, depending on the initial pressure prevailing in the inlet chamber 42, the valve adopts either an open position, where both passages are open, or a half-open throttled position where only the pilot valve is open. When the change-over valve is actuated at the beginning of the filling phase where the full initial pressure possible does not yet prevail in the inlet chamber, the valve will open in two steps. This means, that initially the pilot valve is opened, and a certain pressure balance occurs already between the inlet chamber and the outlet chamber. Subsequently, upon further rise of the magnetic armature 36 after the lost travel $H_2$ of the lost motion clutch 24 has been overcome, by entraining the valve member 33, the main valve will open so that the entire cross-section of the valve is available.

If, however, change-over of the switching valve occurs at a later time, i.e., when the filling phase is completed and the brake system passes over into the actual control, the pilot valve will be opened, but the main valve remains closed because the full initial pressure prevails in the inlet chamber 43.

Because the pressure fluid flows constantly to the return pump on an average through the now opened orifice of the pilot valve, a pressure gradient with a high pressure in the inlet chamber 43 and a low pressure in the outlet chamber 45 will be produced at this orifice. The pressure gradient acts on the effective diameter of the valve member 23, and so great an amount of closing force is applied that the electromagnetic actuating force is no longer able to overcome the closing force. Thus, when operated under pressure, the change-over valve 7 remains in a throttled switching position.

This throttling arrangement effects damping of vibrations in the pressure fluid column upstream of the return pump, which are caused by opening and closing of the suction valve of the return pump 7 designed as a piston pump. Noise development is minimized at the same time.

The result of the properties of the valve is that the valve cannot be moved directly from an open into a throttled position under initial pressure. It is rather possible that the valve is initially closed to be thereafter re-opened, the valve being moved to adopt its throttled position in this switching operation (as has been explained hereinabove). To this end, a corresponding switching sequence must be provided in the control circuit which is triggered in those cases where the change-over valve 9 shall be opened completely in the filling phase and shall be throttled in the control phase.

What is claimed is:

1. Hydraulic vehicle brake system, comprising:
    a brake pressure generator operable by a driver of the vehicle,
    at least one brake circuit connected to the brake pressure generator with wheel brakes and pressure modulation valves by means of which the pressure in the wheel brakes can be modulated according to predetermined control algorithms,
    a pump which delivers pressure fluid into the brake circuit in order to balance out the pressure fluid removed from the brake circuits for the modulation of the wheel brake pressure,
    a separating valve located between the brake pressure generator and a connected brake circuit,
    a precharging pressure generator having its pressure-side outlet connected to a suction side of the pump by way of an intermediary change-over valve in order to deliver pressure fluid to the suction side of the pump during a filling and a control phase for achieving an independent force braking operation, and a control device for evaluating sensor signals and for providing switching signals for the pump and valves, wherein the change-over valve has a closed position, an open position, and a throttled position, and wherein the control device is configured such that in an independent force braking operation the change-over valve adopts its throttled position in the control phase, and wherein the control device includes at least one control algorithm which causes the change-over valve in the filling phase to adopt its open position.

2. Brake system as claimed in claim 1, wherein the control device includes a decision-making circuit which determines the starting brake pressure to be achieved in the filling phase and maintains the change-over valve in its closed position in the filling phase, when the starting brake pressure is lower than the pressure provided by the precharging pressure generator.

3. Vehicle brake system as claimed in claim 1, wherein the change-over valve is configured as a bistable valve which switches into the throttled or into the open position as a function of the inlet pressure, with the actuating force being equal.

4. Vehicle brake system as claimed in claim 3, wherein the bistable valve includes a pilot valve and a main valve connected in parallel thereby forming a parallel pair of valves, wherein a valve seat of one valve of said parallel valve pair is provided on a valve closure member of the other valve of said parallel valve pair, and wherein both valves in said parallel pair of valves have a respectively associated valve actuating member and wherein both valve closure members are operable by means of one single actuating tappet.

5. Vehicle brake system as claimed in claim 4, wherein the valve closure member of the main valve is coupled to the actuating tappet by way of a lost motion clutch.

6. Vehicle brake system as claimed in claim 5, wherein the bistable valve is closed in its non-actuated position, and in that the valve closure member of the main valve has an effective surface which is adjacent to the inlet chamber of the valve so that the actuating force is not sufficient to switch the main valve when a defined pressure difference acts upon the valve-closure member.

7. Brake system as claimed in claim 1, wherein the control device generates a switching signal sequence to switch the change over valve from the open into the throttled position, and the electromagnetic actuation of the change-over valve is initially rendered deenergized so that the change-over valve closes, and in that subsequently a switching signal is generated so that the change-over valve is moved to adopt the throttled position when an initial pressure prevails in the inlet chamber.

* * * * *